Patented June 22, 1954

2,681,928

UNITED STATES PATENT OFFICE 2,681,928

α-PHENYLISOBUTYRYLUREA

Marvin Andrew Spielman, Waukegan, Ill., assignor to Abbott Laboratories, North Chicago, Ill., a corporation of Illinois No Drawing. Application December 22, 1948,
Serial No. 66,850

1 Claim. (Cl. 260—553)

This invention relates to new and useful chemical compounds. More specifically it relates to dimethylphenylacetylurea (α - phenylisobutyrylurea) and processes for producing the same.

Generally the dimethylphenylacetylurea is prepared by reacting α-phenylisobutyric acid with phosphorus pentachloride to give α-phenylisobutyryl chloride. This chloride is then reacted with urea to give the dimethylphenylacetylurea. In more specific detail the production of the acetylurea is given in the following example:

Example: About 0.15 mol. α-phenylisobutyric acid [prepared according to the method of Haller and Bauer, Compt. rend. 155, 1582 (1912)] are admixed with about 0.16 mol. of phosphorus pentachloride. After the vigorous reaction of the two compounds subsides, the resulting solution is fractionated to give α-phenylisobutyryl chloride. This chloride is added dropwise over about a 15 minute period into a refluxing mixture containing about 0.3 mol. urea in about 3 mols. of dry benzene and a few drops of concentrated sulfuric acid. The refluxing is continued for about 40 hours, during which time about 0.1 mol. of additional urea is added. On completing the refluxing, the hot solution is filtered. On cooling the filtrate, a precipitate is formed, which is recovered by filtration and recrystallization from ethanol to give dimethylphenylacetylurea, melting point 129–130° C.

Analysis.—Calculated for $C_{11}H_{14}N_2O_2$: theory—N=13.6%: found—N=13.6%.

Other solvents, such as toluene, chloroform and like solvents, may be used for the reaction of the α-phenylisobutyryl chloride and urea. The sulfuric acid is an acid catalyst, and other acid catalysts may be used, such as phosphoric acid, and the like. The catalyst increases the speed of the reaction but is by no means essential.

The compound of my invention has been found to have valuable therapeutic properties. For example, the dimethylphenylacetylurea has been found to possess valuable anti-convulsant properties.

Others may readily adapt the invention for use under various conditions of service, by employing one or more of the novel features disclosed, or equivalents thereof. As at present advised with respect to the apparent scope of our invention, I desire to claim the following subject matter.

I claim:
The compound α-phenylisobutyrylurea.

References Cited in the file of this patent

UNITED STATES PATENTS

| Number | Name | Date |
|---|---|---|
| 996,096 | Kropp et al. | June 27, 1911 |
| 2,090,593 | Jacobson | Aug. 17, 1937 |
| 2,135,064 | Whitmore et al. | Nov. 1, 1938 |

FOREIGN PATENTS

| Number | Country | Date |
|---|---|---|
| 7,591 | Great Britain | Nov. 16, 1911 |
| 249,241 | Germany | July 13, 1912 |
| 264,804 | Great Britain | May 26, 1927 |